US008763880B2

(12) United States Patent
Wittebrood

(10) Patent No.: US 8,763,880 B2
(45) Date of Patent: Jul. 1, 2014

(54) ALUMINIUM BRAZING SHEET MATERIAL FOR FLUXLESS BRAZING

(75) Inventor: Adrianus Jacobus Wittebrood, Velserbroek (NL)

(73) Assignee: Aleris Rolled Products Germany GmbH, Koblenz (DE)

( * ) Notice: Subject to any disclaimer, the term of this patent is extended or adjusted under 35 U.S.C. 154(b) by 0 days.

(21) Appl. No.: 13/981,648

(22) PCT Filed: Jan. 19, 2012

(86) PCT No.: PCT/EP2012/050769
§ 371 (c)(1),
(2), (4) Date: Jul. 25, 2013

(87) PCT Pub. No.: WO2012/104147
PCT Pub. Date: Aug. 9, 2012

(65) Prior Publication Data
US 2013/0306714 A1    Nov. 21, 2013

Related U.S. Application Data

(60) Provisional application No. 61/438,839, filed on Feb. 2, 2011.

(30) Foreign Application Priority Data

Jan. 31, 2011  (EP) .................................... 11152733

(51) Int. Cl.
| | |
|---|---|
| *B23K 31/02* | (2006.01) |
| *B23K 1/19* | (2006.01) |
| *B23K 35/28* | (2006.01) |
| *C22C 1/06* | (2006.01) |
| *C22C 21/10* | (2006.01) |
| *C22C 21/06* | (2006.01) |
| *C22C 21/08* | (2006.01) |
| *C22C 1/02* | (2006.01) |
| *B32B 15/01* | (2006.01) |
| *B23K 35/38* | (2006.01) |
| *C22F 1/047* | (2006.01) |
| *C22C 21/02* | (2006.01) |
| *B23K 1/00* | (2006.01) |
| *C22F 1/043* | (2006.01) |
| *C22C 21/04* | (2006.01) |
| *B23K 35/02* | (2006.01) |
| *F28F 21/08* | (2006.01) |

(52) U.S. Cl.
CPC ................ *B23K 35/288* (2013.01); *B23K 1/19* (2013.01); *C22C 1/06* (2013.01); *C22C 21/10* (2013.01); *F28F 21/089* (2013.01); *C22C 21/06* (2013.01); *C22C 21/08* (2013.01); *C22C 1/02* (2013.01); *B32B 15/016* (2013.01); *B23K 35/38* (2013.01); *C22F 1/047* (2013.01); *C22C 21/02* (2013.01); *B23K 1/0012* (2013.01); *C22F 1/043* (2013.01); *C22C 21/04* (2013.01); *B23K 35/0238* (2013.01); *B23K 35/0233* (2013.01); *B23K 35/286* (2013.01)
USPC .......................................... 228/56.3; 228/246

(58) Field of Classification Search
None
See application file for complete search history.

(56) References Cited

U.S. PATENT DOCUMENTS

| | | | | |
|---|---|---|---|---|
| 5,971,258 | A * | 10/1999 | Eichhorn et al. | 228/262.51 |
| 6,063,510 | A * | 5/2000 | Inabayashi et al. | 428/654 |
| 2001/0007720 | A1* | 7/2001 | Soga et al. | 428/654 |
| 2001/0040180 | A1* | 11/2001 | Wittebrood et al. | 228/219 |
| 2002/0037425 | A1* | 3/2002 | Mooij et al. | 428/652 |
| 2002/0086179 | A1* | 7/2002 | Wittebrood | 428/652 |
| 2002/0168541 | A1* | 11/2002 | Palmer et al. | 428/654 |
| 2003/0091856 | A1* | 5/2003 | Wittebrood | 428/654 |
| 2003/0099856 | A1  | 5/2003 | Takeno et al. | |
| 2004/0115468 | A1* | 6/2004 | Wijenberg et al. | 428/647 |
| 2004/0121180 | A1* | 6/2004 | Wittebrood et al. | 428/652 |

(Continued)

FOREIGN PATENT DOCUMENTS

| | | | |
|---|---|---|---|
| EP | 1254965 A1 | 11/2002 | |
| EP | 1430988 A1 | 6/2004 | |

(Continued)

OTHER PUBLICATIONS

International Search Report dated Feb. 21, 2012 from PCT/EP2012/050769 to Wittebrood filed Jan. 19, 2012.
Written Opinion dated Feb. 21, 2012 from PCT/EP2012/050769 to Wittebrood filed Jan. 19, 2012.
"ASTM G69—12 Standard Test Method for Measurement of Corrosion Potentials of Aluminum Alloys", URL < http://www.astm.org/Standards/G69.htm >, retrieved from the Internet Apr. 11, 2014.

(Continued)

*Primary Examiner* — Kiley Stoner
(74) *Attorney, Agent, or Firm* — Novak Druce Connolly Bove + Quigg LLP

(57) ABSTRACT

A brazing sheet material including a core alloy layer bonded on at least one side with an aluminum brazing clad layer or layers forming a filler material of a 4000-series aluminum alloy. The core layer is made from an aluminum alloy having (in wt. %): Mg 1.0 to 3.0, Mn 0 to 1.8, Cu 0 to 0.8, Si 0 to 0.7, Fe 0 to 0.7, optionally one or more elements selected from the group (Zr, Cr, Hf, T), Zn 0 to 0.5, impurities and aluminum. The filler material forms a 4000-series aluminum alloy further including one or more wetting elements selected from Bi 0.03-0.5, Pb 0.03-0.5, Sb 0.03-0.5, Li 0.03-0.5, Se 0.03-0.5, Y 0.03-0.05, Th 0.03-0.05, wherein the sum of these elements being 0.5% or less.

24 Claims, No Drawings

(56) References Cited

U.S. PATENT DOCUMENTS

| | | |
|---|---|---|
| 2004/0238605 A1 | 12/2004 | Nishimura et al. |
| 2007/0099023 A1* | 5/2007 | Dulac et al. .............. 428/654 |
| 2007/0158386 A1 | 7/2007 | Dulac et al. |
| 2008/0003451 A1* | 1/2008 | Suzuki et al. .............. 428/654 |
| 2008/0011816 A1* | 1/2008 | Kilmer .............. 228/262.51 |
| 2008/0302521 A1* | 12/2008 | Kim et al. .............. 165/173 |
| 2009/0324985 A1* | 12/2009 | Tsuruno et al. .............. 428/576 |
| 2010/0086802 A1* | 4/2010 | Graham et al. .............. 428/576 |
| 2010/0112370 A1* | 5/2010 | Ueda et al. .............. 428/576 |
| 2010/0151273 A1* | 6/2010 | Wittebrood .............. 428/650 |
| 2010/0247954 A1 | 9/2010 | Chu et al. |
| 2010/0291400 A1* | 11/2010 | Ahl et al. .............. 428/576 |
| 2011/0111254 A1* | 5/2011 | Wittebrood et al. .......... 428/654 |
| 2011/0146937 A1 | 6/2011 | Storm et al. |
| 2011/0198392 A1 | 8/2011 | Wittebrood |
| 2011/0204124 A1* | 8/2011 | Wittebrood .............. 228/219 |
| 2011/0315748 A1* | 12/2011 | Dulac et al. .............. 228/256 |
| 2012/0177947 A1* | 7/2012 | Abrahamsson et al. ...... 428/654 |
| 2013/0034744 A1 | 2/2013 | Anderson et al. |

FOREIGN PATENT DOCUMENTS

| | | |
|---|---|---|
| JP | 3124394 A | 5/1991 |
| WO | 2004112992 A2 | 12/2004 |
| WO | 2010000553 A1 | 1/2010 |
| WO | 2010052231 A1 | 5/2010 |
| WO | 2010114740 A1 | 10/2010 |

OTHER PUBLICATIONS

"Galvanic corrosion" from Wikipedia, the free encyclopedia, URL <https://en.wikipedia.org/wiki/Galvanic_corrosion >: retrieved from the Internet Apr. 11, 2014.

* cited by examiner

ALUMINIUM BRAZING SHEET MATERIAL FOR FLUXLESS BRAZING

CROSS-REFERENCE TO RELATED APPLICATIONS

This is a §371 National Stage Application of International Application No. PCT/EP2012/050769 filed on 19 Jan. 2012, claiming the priority of European Patent Application No. 11152733.9 filed on 31 Jan. 2011 and U.S. Patent Application No. 61/438,839 filed on 2 Feb. 2011.

FIELD OF THE INVENTION

The invention relates to a brazing sheet material comprising of a core alloy layer bonded on at least one side with an aluminium brazing clad layer or layers forming a filler material of a 4000-series aluminium alloy. Furthermore, the invention relates to a method of brazing a brazed assembly incorporating at least one member made from the brazing sheet material.

BACKGROUND TO THE INVENTION

As will be appreciated herein below, except as otherwise indicated, aluminium alloy designations and temper designations refer to the Aluminium Association designations in Aluminium Standards and Data and the Registration Records, as published by the Aluminium Association in 2010 and are well known to the person skilled in the art.

For any description of alloy compositions or preferred alloy compositions, all references to percentages are by weight percent unless otherwise indicated.

Brazing sheet products find wide applications in heat exchangers and other similar equipment. Conventional brazing sheet products have a core of, typically, but not exclusively an aluminium alloy of the 3xxx-series, having on at least one surface of the core sheet a brazing material or filler material in the form of an aluminium clad brazing layer (also known as an aluminium cladding layer). The aluminium clad layer is made of a 4xxx-series alloy comprising silicon in an amount in the range of 4% to 20% by weight, and preferably in the range of about 6% to 14% by weight. The aluminium clad layer may be coupled or bonded to the core alloy in various ways known in the art, for example by means of roll bonding, cladding spray-forming or semi-continuous or continuous casting processes. These aluminium clad layers have a liquidus temperature typically in the range of about 540° C. to 615° C., and which must be lower than of the core alloy. As used herein, "liquidus temperature" is the temperature at which an aluminium alloy begins to solidify during cooling from its liquid state.

Heat exchangers such as condensers, evaporators and the like for use in car coolers, air conditioning systems, industrial cooling systems, etc. usually comprise a number of heat exchange tubes arranged in parallel between two headers, each tube joined at either end to one of the headers. Corrugated fins are disposed in an airflow clearance between adjacent heat exchange tubes and are brazed to the respective tubes.

There is a demand for brazing sheet material having a good corrosion resistance and high post-braze strength. Ideally such a brazing sheet material is for use in a controlled atmosphere brazing process without the use of brazing fluxes.

DESCRIPTION OF THE INVENTION

It is an object of the invention to provide a brazing sheet material having increased post-braze strength.

It is another object of the invention to provide a brazing sheet material having increased post-braze strength after being brazed in a fluxless controlled atmosphere brazing process.

These and other objects and further advantages are met or exceeded by the present invention providing a brazing sheet material comprising of a core alloy layer bonded on at least one side with an aluminium brazing clad layer or layers forming a filler material of a 4000-series aluminium alloy, wherein the core layer is made from an aluminium alloy comprising of, in wt. %:

| | |
|---|---|
| Mg | 1.0% to 3.0% |
| Mn | 0 to about 1.8% |
| Cu | 0 to about 0.8% |
| Si | 0 to about 0.7% |
| Fe | 0 to about 0.7%, | optionally one or more elements selected from the group consisting of:

(Zr 0.04% to 0.4%, Cr 0.04% to 0.4%, Hf 0.04% to 0.4%, Ti 0.01% to 0.3%),

Zn 0 to about 0.5%, unavoidable impurities and balance aluminium, and wherein the filler material forms a 4000-series aluminium alloy further comprising one or more wetting elements selected from the group consisting of: Bi 0.03% to 0.5%, Pb 0.03% to 0.5%, Sb 0.03% to 0.5%, Li 0.03% to 0.5%, Se 0.03% to 0.5%, Y 0.03% to 0.05%, Th 0.03% to 0.05%, and the sum of these elements being 0.5% or less.

In accordance with the invention it has been found that the core alloy material having a significant concentration of Mg as its main essential alloying element in combination with the clad layer(s) forming the AlSi filler material can be brazed in a controlled atmosphere brazing (CAB) process devoid of any use of salt-based brazing flux material, such as for example the well known Nocolok® (registered trademark) brazing flux or the more expensive CAB fluxes that are modified with Cesium to moderately increase the tolerance for Mg. Thus it can be brazed in a fluxless CAB operation. This leads to significantly increased strength levels in the post-braze condition in combination with a very good corrosion resistance. As the brazing sheet material can be brazed without the use of brazing flux material, the corrosion resistance is further increased as there can be no brazing flux residue present in the post-braze condition which may otherwise adversely affect the corrosion resistance, in particular flux residue on any innersurface of the heat exchanger made from the brazing sheet material is avoided.

Also the need for the much more costly vacuum brazing ("VB") process is not required for the current brazing sheet material. Commonly in industry practice the vacuum brazing is carried out at relatively low atmosphere pressure in the order of about $1.10^{-5}$ mbar or less, and is carried out as a batch process and requires considerable capital investments. For the purposes of this invention, and as used herein, the term "controlled atmosphere brazing" or "CAB" refers to a brazing process which utilizes an inert atmosphere, for example, nitrogen, argon or helium in the brazing of aluminium alloy articles, and is distinct from vacuum brazing in particular in that with CAB the brazing atmosphere in the furnace during the brazing operation is at about regular atmospheric pressure, although a slight under-pressure (for example working at a pressure of about 0.1 bar or more) or having a slight over-pressure can be used to facilitate the control of the inert atmosphere and to prevent an influx of oxygen containing gas into the brazing furnace.

It has been found that the brazing filler material is very tolerant to the presence of Mg, and is a preferred embodiment Mg is even purposively added to the filler material in a range of up to 0.9%. Since the brazing filler is Mg tolerant there is no adverse consequence of any diffusion of Mg from the core alloy into the brazing filler material during a brazing cycle. Therefore there is no need for the use of any interlayer, in particular low in its Mg concentration, positioned or disposed between the core layer and the brazing filler preventing such diffusion of Mg. In a preferred embodiment the current brazing sheet material is devoid of an interlayer material or interliner layer interposed or disposed between the core alloy layer and the aluminium brazing clad layer such that the brazing clad layer is bonded onto the core alloy layer.

In the present invention, the Mg levels in the core alloy can be up to about 3.0%, and preferably up to about 2.8%. A too high Mg level results in the formation of relatively low melting phases in the core alloy. Consequently, if such low melting phases are present in the core alloy the temperature at which any subsequent brazing operation is carried out when using the current brazing sheet material should be lowered. And this would require also the use of brazing filler material having a lower melting temperature. In these Mg ranges provides a good corrosion resistance against brackish water and sea water. Furthermore, during the life time cycle of a heat exchanger incorporating the current brazing sheet material the core alloy is exposed to elevated temperatures which may lead to a sensitization effect of the core alloy. If the Mg level in the core alloy is above 3.0% the sensitization may have an adverse effect on the corrosion resistance of the material. To provide increased strength levels to the core alloy the Mg content should be at least 1.0%. In a preferred embodiment the Mg level is at least about 2.0%. And in a more preferred embodiment it is at least about 2.3%, for example 2.4% or 2.6%. Mg is a very potent solid solution strengthening element in aluminium. And when Mg is present at high enough concentrations in combination with silicon then it can participate in an age-hardening reaction, which can significantly increase the strength of the material in the post-braze condition.

The Mn can be present in the core alloy to a level of up to about 1.8% as a dispersoid forming element to control grain structure during thermo-mechanical processing and thereby increasing the strength of the core alloy in the post-braze condition. Furthermore, it increases the eutectic temperature of the core alloy. As used herein, "eutectic temperature" is the temperature at which an aluminium alloy completely solidifies during cooling from its liquid state. When purposively added it is preferably in a range of about 0.5% to 1.8%, and more preferably in a range of about 0.5% to 1.0%.

In another embodiment of the core alloy there is no purposive addition of Mn such it can be tolerated to a level of up to about 0.5%, and more preferably of up to 0.3%.

Cu can be present in the core alloy up to about 0.8% as a strengthening element. However, in applications where the corrosion resistance is importance, it is preferred to maintain the Cu content to a low level of preferably up to about 0.3%. In a more preferred embodiment the Cu content is up to 0.1%.

Si can be present up to about 0.7% in the core alloy as a purposive alloying element. Together with the Mg in the core alloy it may contribute to the post-braze strength. In a preferred embodiment the Si content is up to about 0.6%. A preferred lower-limit for the Si content is about 0.1%.

To the core alloy optionally one or more elements are added selected from the group consisting of:

| | |
|---|---|
| Zr | 0.04% to 0.4%, preferably about 0.06% to 0.2%, |
| Cr | 0.04% to 0.4%, preferably about 0.06% to 0.2%, |
| Hf | 0.04% to 0.4%, preferably about 0.06% to 0.2%, |
| Ti | 0.01% to 0.3%, preferably about 0.02% to 0.2%. |

These elements can inhibit recrystallisation in the core alloy and consequently increase the strength and corrosion resistance in the post-braze condition.

Ti can be added to the alloy product also for grain refiner purposes during casting of the alloy stock, e.g. ingots or billets. The addition of Ti should not exceed about 0.15% when added for grain refiner purposes, and preferably it should not exceed about 0.1%. A preferred lower limit for the Ti addition is about 0.01%. Ti can be added as a sole element or with either boron or carbon serving as a casting aid for grain size control.

Fe should be in a range of up to about 0.7%. At too low levels the product is commercially less attractive, and some Fe is preferred for formability purposes. A preferred lower-limit for the Fe-content is about 0.07%, and more preferably about 0.1%. A preferred upper-limit for the Fe-content is about 0.4%.

Zn is not purposively added to the core alloy according to this invention, but can be tolerated without adversely affecting relevant properties to a level of up to about 0.5%. In a more preferred embodiment the upper-limit for the Zn content is about 0.2%, and more preferably about 0.1%.

The core alloy material can contain normal and/or inevitable elements and impurities, typically each <0.05% and the total <0.2%, and the balance is made by aluminium.

In an embodiment of the invention the core layer is made from an aluminium alloy consisting of, in wt. %:

| | |
|---|---|
| Mg | 1.0 to 3.0 |
| Mn | 0 to 1.8 |
| Cu | 0 to 0.8 |
| Si | 0 to 0.7 |
| Fe | 0 to 0.7, | optionally one or more elements selected from the group consisting of:
(Zr 0.04 to 0.4, Cr 0.04 to 0.4, Hf 0.04 to 0.4, Ti 0.01 to 0.3),
Zn 0 to 0.5,
unavoidable impurities and balance aluminium.

More preferred embodiments of the composition of the core alloy are set out in this description and in the claims.

In the brazing sheet material according to this invention the core alloy is clad on at least one side with a filler material of an 4000-series aluminium alloy, preferably having about 6% to 14% Si, and more preferably about 9% to 12% Si, and having at least one wetting element selected from the group of Bi, Pb, Li, Sb, Se, Y, and Th, and wherein the total amount of these elements is 0.5% or less to facilitate the fluxless CAB process. The term "filler" is used to refer to an aluminium alloy which is used to braze the core to other components. And as is known in the art the filler alloy can be made of a single clad layer or it can be made from two separate clad layers, each being made of a 4000-series alloy, bonded to each other and that melt during the brazing operation and in the molten condition of both layers forming the chemical composition of the filler alloy as herein defined.

Preferably in addition to the wetting element also Mg is being added and controlled in a range of about 0.15% to 0.9%, and more preferably the upper limit is about 0.5%, and more preferably about 0.3%. A more preferred lower-limit for the Mg content is 0.18%.

In a preferred embodiment the element Bi is selected from the group of wetting elements and is in a range of about 0.03% to 0.5%, and preferably in a range of about 0.05% to 0.35%, and more preferably of about 0.12% to 0.35%, as being the most efficient wetting element for this purpose in this alloy system during a fluxless CAB operation. By carefully controlling the amount of Mg and Bi in the filler alloy, both elements are purposively added to the filler alloy, good fillet formation is obtained in the fluxless CAB process. As an alternative for adding Bi to the filler alloy, the Bi can be replaced in part or in whole by lead or antimony or any of the other wetting elements alone or in combination. However, these wetting elements are used on a less preferred basis. Ideally solely Bi is being added to the filler alloy.

In the embodiment that Bi is added to the brazing material layer it is further preferred that any excess Mg content with respect to stoichiometric composition of $Bi_2Mg_3$ is 0.07% or less. It has been found that Bi has a low solubility in aluminium and tends to separate out at the grain boundaries even when added at low levels of for example about 0.15%. To overcome this problem a small amount of Mg will form $Bi_2Mg_3$ which stops separation at the grain boundaries. This $Bi_2Mg_3$ phase will, however, dissolve in the brazing clad layer material upon melting of the filler material releasing the Bi to lower the surface tension of the molten filler.

The amount of Fe present in the filler alloy depends primarily on the origin of the alloy material and can be up to about 0.8%, and preferably is not more than about 0.6%. As grain refiner element Ti can be present in the brazing material in a range of up to about 0.2%, preferably up to 0.15%. In a range of up to 0.3% Cu is tolerable as impurity element.

Mn can be present in the filler alloy in a range of 0 to about 1.5%. When present as impurity it can be tolerated to 0.3%. However, it may also be purposively added in a range of 0.3% to 1.5%. A more preferred upper-limit for the Mn addition is 1.0%.

The balance is made by unavoidable or incidental impurities, typically each 0.05% maximum, and the total 0.15% maximum, and aluminium.

The filler alloy is preferably free of each of the elements Na, K, and Ca to avoid any interference with the wetting element, e.g. Bi, and Mg during the brazing operation. With "free" is meant that no purposeful addition of Na, K, and Ca was made to the chemical composition but that due to impurities and/or leaking from contact with manufacturing equipment, trace quantities of Na, K, and Ca may nevertheless find their way into the filler alloy product.

In an embodiment the filler alloy may further contain one or more elements selected from the group of: Zn 0.5% to 5%, Sn 0.2% to 1%, In 0.1% to 1%, to favourably lower the corrosion potential of the brazing sheet.

If not purposively added Zn can be tolerated as impurity element up to 0.4%.

In one particular embodiment of the brazing sheet material the filler material comprises of, in wt. %:

| | |
|---|---|
| Si | 6 to 14, preferably about 9 to 12, and more preferably about 10, |
| Mg | 0.02 to 0.5, preferably 0.15 to 0.3, |
| Bi | 0.05 to 0.5, preferably 0.12 to 0.35, |
| Fe | 0 to 0.8, preferably 0 to 0.6, |
| Zn | 0 to 0.4, |
| Mn | 0 to 0.3, preferably 0 to 0.1, |
| Cu | 0 to 0.3, preferably 0 to 0.05, |
| Ti | 0 to 0.2, preferably 0 to 0.15, | unavoidable impurities and balance aluminium.

There are several possible configurations for the brazing sheet material according to the invention.

In an embodiment the Al—Mg core alloy layer is provided on one side with the Al—Si alloy filler material and whereby the other side of the core layer is bare such that the brazing sheet material comprises of a two or three layer configuration in dependence of whether the filler material consists of one layer or of two clad layers.

In an alternative embodiment of the brazing sheet material according to this invention the Al—Mg core alloy layer is provided on both sides with the Al—Si alloy filler material layer. Alternatively, the other side of the core layer is bonded to another Al—Si clad layer material.

In another embodiment, when one side of the Al—Mg core alloy layer is clad with the Al—Si alloy filler material according to this invention and on the other side of the core alloy layer an outerlayer is applied. The outerlayer or outerliner would generally be of an alloy tailored to provide high corrosion resistance or even corrosion combined with erosion resistance in the environment to which that face of the brazing sheet material is exposed, for example when used as a waterside liner in a heat exchanger. An example of a suitable outerliner would be an aluminium alloy having a purposive addition of Zn (up to about 6%) as its main alloying element, for example AA7072 or AlZn alloys having about 1% or about 3% Zn. During the brazing cycle some Zn will diffuse into the core layer and Mg from the core alloy will diffuse into the outerliner. This results to the formation of a diffusion layer that is age-hardenable and added to the post-braze strength of the brazing sheet material.

One particular useful waterside liner material comprises of, in wt. %,

| | |
|---|---|
| Zn | 0.3 to 3, and preferably about 1.5 to 2.5, |
| Mg | 0.2 to 1.25, and preferably about 0.45 to 1.10, |
| Mn | 0 to 0.9, preferably less than about 0.4, |
| Cu | 0 to 0.1, preferably less than 0.03, | optionally one or more elements selected from the group consisting of (Zr 0.05 to 0.3, Cr 0.05 to 0.3, Ti 0.01 to 0.4),

| | |
|---|---|
| Fe | 0 to about 0.6 |
| Si | 0 to about 0.5, | other elements and unavoidable impurities, each maximum 0.05, total 0.2, and balance aluminium, The aluminium brazing sheet material of the current invention while using incorporating also this waterside liner (coolant side) can be brazed in a fluxless CAB operation into a brazed tube, in particular a brazed folded tube, more in particular a single-port or multi-port folded tube. This achieves the effect of obtaining also an increased erosion resistance of the waterside liner material in the post-braze condition. It has been found that the aluminium alloy used for the waterside liner shows a significant favourable age-hardening effect after exposure to a brazing cycle. A natural ageing effect occurs after being exposed to a brazing cycle. Also an artificial ageing effect occurs after being exposed to a brazing cycle. Due to the ageing effect significant strength and hardness improvements are achieved shortly after the brazing cycle and even during the life time of the heat exchanger. An increased hardness is also associated with an increased erosion resistance of the waterside liner. The current brazing sheet system of core alloy, filler alloy and waterside liner allows for the use of relatively high Mg contents in both the core alloy and in the waterside liner to favourably increase post-braze strength and also the erosion resistance of the waterside liner in the post-braze condition, as it can be brazed in a fluxless CAB operation. It is considered to be known in the art that a too high Mg content in the core alloy and/or the brazing filler alloy and/or in the waterside liner results in an undesirable interaction with any oxygen in the controlled inert gas atmosphere during CAB brazing and disrupts the formation of a smooth and acceptable fillet. This current brazing sheet system allows for the production of brazed tubes having high post-braze strength of the core alloy and improved erosion resistance (due to in particular increase Zn and Mg levels) when brazed in a fluxless CAB process.

The brazing sheet material according to the invention has a typical thickness at final gauge in the range of about 0.05 mm to 4 mm. The brazing sheet material is preferably up to about 350 microns thick at final gauge, and more preferably in a range of about 100 microns to 260 microns thick, e.g. 240 microns.

The brazing clad material layer has preferably a thickness which is about 3% to 15% of the entire thickness of aluminium alloy brazing sheet material, e.g. 10%.

The brazing sheet material according to this invention can be manufactured via various techniques. For example by roll bonding as is well known in the art and which is preferred. Alternatively the Al—Si brazing alloy layer can be applied onto the core alloy layer by means of thermal spraying techniques. Or alternatively the core alloy layer and the Al—Si alloy brazing clad material can be manufactured by means of casting techniques, for example as disclosed in each of the international patent documents WO-2004/112992, WO-2010/000553, and WO-2010/114740.

There can be several types of final products manufactured from the current brazing sheet material. One embodiment is sheet for tubestock, in particular high strength tubestock material, which will typically have a gauge ranging up to about 4 mm, with preferred ranger ranges as set out above, and preferably produced in an H2X or H1X temper.

Another embodiment is for the manufacture of a heavier gauge product, such as for a radiator side support or a stiffener plate.

Another embodiment is for the manufacture of brazed tube-and-sheet heat exchangers for Ocean Thermal Energy Conversion ("OTEC") and combining its high strength with good corrosion resistance in a sea water environment and that it can be brazed without using a salt-based brazing flux or without using vacuum brazing.

In another aspect of the invention there is provided a method of manufacturing an article, in particular a heat exchanger, joined by brazing or an assembly of brazed components, comprising the steps of:

(a) providing or forming the components to be brazed together of which at least one is made from an aluminium brazing sheet material according to this invention;

(b) assembling the components into an assembly;

(c) brazing the assembly without applying brazing flux onto the assembly of components, and brazing the whole assembly in an inert gas atmosphere at a brazing temperature, typically at a temperature in a range of about 540° C. to 615° C., e.g. at about 590° C. or at about 600° C., for a period long enough for melting and spreading of the aluminium brazing clad layer material, e.g. a dwell time of about 2 to 5 minutes, typically at around 2 or 3 minutes; and typically the oxygen content in the brazing atmosphere should be as low as reasonable possible, and is preferably below about 500 ppm, and more preferably below about 100 ppm;

(d) cooling of the brazed assembly, typically to below about 100° C., e.g. to ambient temperature.

This method allows for the production of brazed articles having an increased post-braze strength in combination with a good corrosion resistance, e.g. in a brackish or sea water environment. A very important feature is that it can be manufactured by means of a fluxless controlled atmosphere brazing operation while allowing the use of brazing sheet having a 5000-series core alloy, in particular having a Mg content in the range of about 1% to 3%, with preferred narrower ranges. Consequently, there is no longer a need for the application, handling and use of a flux material and thereby significantly simplifying the production process.

The invention claimed is:

1. A brazing sheet material comprising of a core alloy layer bonded on at least one side with an aluminium brazing clad layer or layers forming a filler material of a 4000-series aluminium alloy, wherein the core layer is made from an aluminium alloy comprising, in wt. %:

| | |
|---|---|
| Mg | 2.0 to 3.0 |
| Mn | 0 to 1.8 |
| Cu | 0 to 0.1 |
| Si | 0 to 0.7 |
| Fe | 0 to 0.7, | optionally one or more elements selected from the group consisting of:
Zr 0.04 to 0.4, Cr 0.04 to 0.4, Hf 0.04 to 0.4, and Ti 0.01 to 0.3,
Zn 0 to 0.5,
unavoidable impurities and balance aluminium,
and wherein the filler material comprises, in wt. %:

| | |
|---|---|
| Si | 6 to 14 |
| Mg | 0.02 to 0.5 |
| Bi | 0.05 to 0.5 |
| Fe | 0 to 0.8 |
| Zn | 0 to 0.4 |
| Mn | 0 to 0.3 |
| Cu | 0 to 0.3 |
| Ti | 0 to 0.2, | unavoidable impurities and balance aluminium.

2. A brazing sheet material according to claim 1, wherein the core alloy has a Mg content of 2.0 to 2.8%.

3. A brazing sheet material according to claim 1, wherein the core alloy has a Si content of 0.1 to 0.7%.

4. A brazing sheet material according to claim 1, wherein the core alloy has a Mg content of 2.3% to 3.0%.

5. A brazing sheet material according to claim 1, wherein the core alloy has a Si content of 0.1% to 0.6%.

6. A brazing sheet material according to claim 1, wherein the core alloy is on one side bonded with the filler material, and bonded on the other side with a waterside liner material.

7. A brazing sheet material according to claim 1, wherein the filler material has a Si content of 9 to 12%.

8. A brazing sheet material according to claim 1, wherein the core alloy is on one side bonded with the filler material, and bonded on the other side with an aluminium brazing clad layer of an AA4000-series aluminium alloy.

9. A brazing sheet material according to claim 1, wherein the brazing sheet material is devoid of a diffusion barrier formed by an interliner layer positioned between the core alloy layer and the brazing clad layer.

10. A method of manufacturing an article joined by brazing or an assembly of brazed components, comprising the steps of:
    (a) providing the components to be brazed together of which at least one is made from an aluminium brazing sheet material according to claim 1;
    (b) assembling the components into an assembly;
    (c) brazing the assembly without applying brazing flux onto the assembly of components, and brazing the whole assembly in an inert gas atmosphere at a brazing temperature;
    (d) cooling of the brazed assembly.

11. A brazing sheet material according to claim 1, wherein the core alloy has a Fe content of 0.07% to 0.7%.

12. A brazing sheet material according to claim 1, wherein the core alloy has a Fe content of 0.07% to 0.4%.

13. A brazing sheet material according to claim 1, wherein the core alloy has a Mn content in a range of 0.5% to 1.8%.

14. A brazing sheet material according to claim 1, wherein the core alloy has a Mn content in a range of 0.5% to 1.0%.

15. A brazing sheet material according to claim 1, wherein the filler material has a Bi content in the range of 0.12% to 0.35%.

16. A brazing sheet material according to claim 1, wherein the filler material has a Mg content in the range of 0.15% to 0.3%.

17. A brazing sheet material according to claim 1, wherein the filler has an excess Mg-content of 0.07% or less with respect to stoichiometric composition of $Bi_2Mg_3$.

18. A brazing sheet material according to claim 1, wherein the filler material has a Cu content of 0 to 0.05%.

19. A brazing sheet material according to claim 1, wherein the core layer is made from an aluminium alloy comprising, in wt. %:

| | |
|---|---|
| Mg | 2.3 to 3.0, |
| Mn | 0.5 to 1.8, |
| Cu | 0 to 0.1, |
| Si | 0.1 to 0.7, |
| Fe | 0.07 to 0.4, | one or more elements selected from the group consisting of:
Zr 0.04 to 0.4, Cr 0.04 to 0.4, Hf 0.04 to 0.4, and Ti 0.01 to 0.3, and
Zn 0 to 0.5,
unavoidable impurities, and balance aluminium,
and wherein the filler material comprises, in wt. %:

| | |
|---|---|
| Si | 9 to 12, |
| Mg | 0.15 to 0.3, |
| Bi | 0.12 to 0.35, |
| Fe | 0 to 0.6, |
| Zn | 0 to 0.4, |
| Mn | 0 to 0.1, |
| Cu | 0.05 to 0.3, |
| Ti | 0 to 0.15, | with the proviso that there are one or more elements from the group consisting of Zn 0.5 to 5, Sn 0.2 to 1, and In 0.1 to 1;
wherein the filler material is free of Na, K, and Ca;
unavoidable impurities and balance aluminium.

20. A brazing sheet material according to claim 1, wherein the core has 0.06 to 0.4% Hf.

21. A brazing sheet material according to claim 1, wherein the core has 0.2 to 0.3% Ti.

22. The method, according to claim 10, wherein the article is a heat exchanger.

23. A brazing sheet material according to claim 1, wherein the core alloy has a Mg content of 2.3% to 3.0%, wherein the filler material is a single layer of filler material, wherein the brazing sheet consists of the layer of the filler material bonded with the core alloy.

24. A brazing sheet material according to claim 23, wherein the filler material has a Mg content of 0.3% to 0.5%.

* * * * *